June 8, 1926.  1,587,623
M. E. ZUCKERMAN
PROCESS OF RECLAIMING THE CONSTITUENTS OF LEAD BATTERY PLATES
Filed March 2, 1925
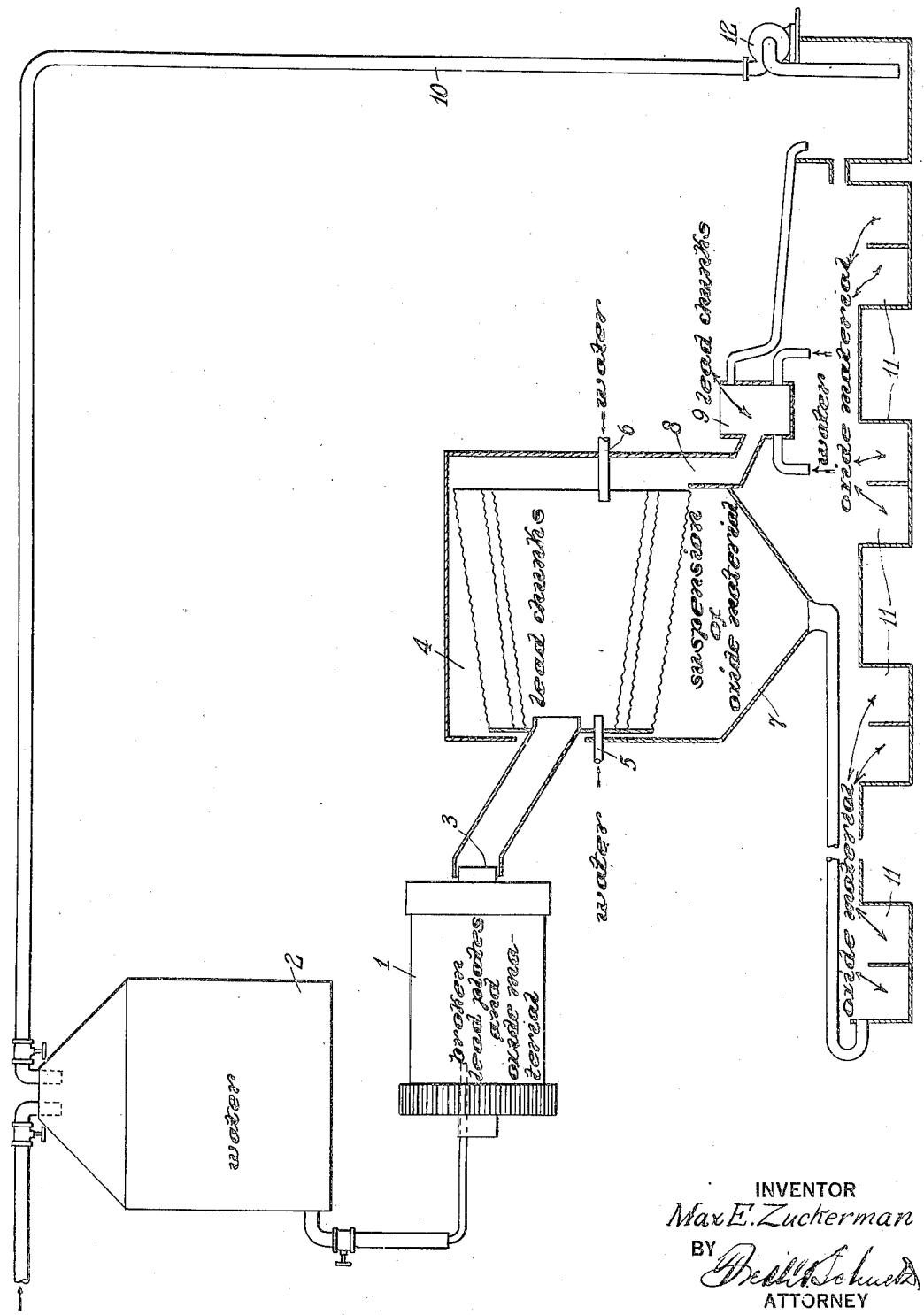
INVENTOR
Max E. Zuckerman
BY
ATTORNEY Patented June 8, 1926.

1,587,623

UNITED STATES PATENT OFFICE.

MAX E. ZUCKERMAN, OF NEW YORK, N. Y.

PROCESS OF RECLAIMING THE CONSTITUENTS OF LEAD BATTERY PLATES.

Application filed March 2, 1925. Serial No. 12,611.

The invention relates to the recovery of the materials constituting the plates of lead storage or secondary batteries, more especially scrap plates and discarded plates such as have become worn out thru service and consisting of a metallic grid, composed in accordance with the present practice of a lead antimony alloy, and the pasted lead oxides held by the grid.

Heretofore it has been proposed to treat such plates by heating and melting the same; but it will be appreciated that all of the metallic grid material (ranging from 35% to 45%) is exposed thereby to the comparatively high temperatures, which cause a marked oxidation and loss of the resultant metal from such operation; and, furthermore, a mixture of lead and antimony results, no pure lead being obtainable.

It is the object of the present invention to afford a more perfect separation and efficient recovery, and to so treat grid and pasted oxides that a higher percentage of the total metal is recoverable and that a portion may be recovered, if desired, as comparatively pure lead or a lead product such as a pigment, litharge or red lead.

To this end, the invention consists, generally, in crushing the grid and pasted oxides together in the presence of a suitable liquid vehicle as water, then separating the one from the other and from the said vehicle and treating the separated portions for the recovery of the contents.

The nature of the invention, however, will best be understood when described in connection with the accompanying drawing which illustrates more or less diagrammatically the general arrangement of the apparatus employed for carrying out the novel process.

In accordance therewith, a distinct separation of the metallic grid material and the pasted oxides carried thereby is first to be effected, it being understood that where antimony is present in the combined original constituents to the extent of approximately 4%, the percentage of same will be increased in the resultant alloyed metal to from 6% to 8% thru the separation of oxides therefrom. The waste pasted oxides consist generally of a mixture of approximately 60% lead oxides and 40% lead sulphate; and the same may be either reduced to a commercially pure lead or otherwise treated, as chemically and leached, dried and milled to produce a pigment, litharge or red lead.

The process comprehends first the breaking up of the lead plates with contained oxide material as in a ball or tube mill 1 wherein the metal is broken up into chunks of suitable size; and simultaneously therewith there is to be added a liquid vehicle, such as water, which may be obtained from a storage tank 2 and fed thereto in regulated quantities. This vehicle assists in the breaking up action and affords also an intimate suspension of the oxide material therein; and said vehicle serves, moreover, to flow out the crushed materials. To this end, the mill is caused to discharge thru a grated outlet 3 into a suitable separating apparatus as a screen separator 4 to which further quantities of the vehicle may be added as required, as thru pipes 5 and 6. The vehicle with oxide materials suspended therein is discharged from said screen thru a hopper 7 at the bottom thereof, and the metal pieces thru a metal collector 8 at the opposite end of the separator. The metal chunks thus discharged from the separator are delivered to a washing apparatus 9 and are washed with some fresh or reclaimed portions of the liquid vehicle in order to eliminate any wood or rubber or like foreign material which may originally have been present. The water therefrom may be pumped back to the storage tank 2 thru a pipe 10. The metallic portion thus washed may be melted in any suitable furnace (not shown) and pigged or refined ready for use either as an antimonial lead for the production of grids or for other commercial purposes; or, when required, it may be further refined.

The oxide material on the other hand, is arranged to be conducted by means of the liquid vehicle to a series of settling tanks 11 of any well-known or special construction suitable for settling out of the suspended material. The overflow of the liquid from these tanks may be returned by a pump 12 to the liquid storage tank 2 for reuse, thus completing the liquid circuit. From the settling tanks, the oxide material is transferred either to a suitable reverberatory furnace (not shown) for reduction to commercially pure lead and pigged and ready for use as a commercial pig lead; or, it may be further refined, if necessary.

Or, the material from the settling tanks may be further treated, for example, chemically, as with a suitable alkaline solution such as a solution of sodium carbonate of a strength depending on the sulphate content of the paste, to convert it into an appropriate lead salt either normal or basic lead carbonate accordingly as it is treated cold or hot, after which it will be leached with water to eliminate sulphate and the residue dried and heated in any suitable manner, as by a tray or spray dryer apparatus. If desired, coloring of the same, as is well understood, may also be effected during this stage; and the dried oxides or the like then passed to a suitable air swept mill or the like (not shown) for grinding to the desired fineness.

By the process hereinbefore described, practically all of the waste material is recovered and in substantially pure condition, thus affording an additional source of commercially pure lead where the oxides are reduced to this condition, or a source of high grade pigment or litharge when treated as set forth.

I claim:

1. The process of recovering the material of worn out or scrap lead storage battery plates, which consists in crushing the metallic grid and pasted oxides together and in the presence of a liquid vehicle, discharging said vehicle with plate materials, and separating the same from each other and from the vehicle.

2. The process of recovering the material of worn out or scrap lead storage battery plates, which consists in crushing the metallic grid and pasted oxides together and in the presence of water, discharging said water with plate materials, and separating the same from each other and from the water.

3. The process of recovering the material of worn-out or scrap lead storage battery plates, which consists in crushing the metallic grid and pasted oxides together and in the presence of a liquid vehicle, discharging said vehicle with plate materials, screening off the metallic grid pieces and allowing the oxide material to settle out from the liquid vehicle in which it is suspended.

In testimony whereof I affix my signature.

MAX E. ZUCKERMAN.